United States Patent
Koenecke

[15] 3,667,196
[45] June 6, 1972

[54] ADJUSTABLE CYCLONE SEPARATOR

[72] Inventor: William J. Koenecke, Glen Rock, N.J.

[73] Assignee: Metal Improvement Company, Inc.

[22] Filed: Sept. 1, 1970

[21] Appl. No.: 68,697

[52] U.S. Cl. .................................. 55/312, 55/357, 55/411, 55/459
[51] Int. Cl. .................................................. B04c 5/04
[58] Field of Search ....................... 55/309–311, 312–314, 55/357, 418, 411, 459, 460, 393, 417; 209/144, 211; 210/512, 120, 130, 304

[56] References Cited

UNITED STATES PATENTS

| 438,523 | 10/1890 | Bretney | 55/417 |
| 798,437 | 8/1905 | Morse | 55/415 |
| 1,281,238 | 10/1918 | Wegner | 55/412 |
| 2,952,330 | 9/1960 | Winslow | 55/417 |
| 3,010,579 | 11/1961 | Duesling | 209/211 |
| 3,200,568 | 8/1965 | McNeil | 55/459 |

*Primary Examiner*—Bernard Nozick
*Attorney*—Arthur Frederick and Victor D. Behn

[57] ABSTRACT

In a cyclone separator, a valve means adjustable to cause partial by-pass of gaseous fluid and solid particles entrained therein from the separation chamber to the gaseous fluid outlet. Also, means is provided for adjusting the location of the valve means relative to the separation chamber.

7 Claims, 5 Drawing Figures

INVENTOR.
WILLIAM J. KOENECKE
BY
Arthur Frederick
ATTORNEY

INVENTOR.
WILLIAM J. KOENECKE

BY
*Arthur Frederick*
ATTORNEY 3,667,196

ADJUSTABLE CYCLONE SEPARATOR

DISCLOSURE OF THE INVENTION

This invention relates to cyclone type separators and, more particularly, to a cyclone separator having an adjustable means for varying the separating effectiveness of the assembly.

BACKGROUND OF THE INVENTION

In systems wherein the average mass of the solid particles entrained in the gaseous fluid stream varies, the resultant solid separation will vary. Where, in these systems, the recovery of separated solids is the primary function of the cyclone separator, rather than obtaining a solids free gaseous fluid stream, the variation in the mass composition of the separated solids recovered is undesirable. This undesirable variation in the composition of the solids recovered in the cyclone separators is particularly disadvantageous in shot peening, recovery and recirculation systems in which the proper mass of the recovered shot is essential for the subsequent optimum treatment of the surfaces of work pieces being peened. One proposed solution to the problem is controlling the velocity of the gaseous fluid, as for example by adjustment of the speed of the blower or exhauster. However, this latter solution is unsatisfactory since the range of effectiveness is exceedingly limited.

Accordingly, it is an object of this invention to provide a cyclone separator which is capable of adjustment to disentrain solid particles of a desired minimum mass from a gaseous fluid stream containing an indiscriminate mixture of solid particles of different masses when the mass composition of the entrained particles change.

Another object of the present invention is to provide a cyclone separator which is capable of adjustment to achieve optimum recovery of entrained solids of a desired mass from a gaseous fluid stream under a wide range of mass characteristics of the entrained solids.

A further object of this invention is to provide a cyclone separator which has a relatively simple means for bypassing a portion of the gaseous fluid containing solids below the desired minimum mass to the gaseous fluid outlet before substantially complete separation of the entrained solids from the gaseous fluid.

A feature of the present invention is an adjustable by-pass gate or valve means controlling a by-pass opening in a centrally located core which forms a gaseous fluid outlet conduit and defines with the housing a separation chamber.

Another feature of the present invention is the means for rotatively supporting and adjusting the core relative to the housing or shell to thereby position the by-pass valve in the separation chamber.

SUMMARY OF THE INVENTION

It is therefore contemplated by the present invention to provide a cyclone separator which comprises a hollow core disposed within and spaced from a shell or housing to define therebetween an annular separation chamber. The shell also defines a solids collection chamber located below the separation chamber to receive disentrained solids. An inlet conduit means is tangentially connected at one end to the annular separation chamber and at the opposite end to a source of gaseous fluid containing entrained solid particles to receive and discharge the gaseous fluid into the annular separation chamber. The hollow core forms a gaseous fluid outlet passageway which is open at its lower end and is spaced from the solids collection chamber to communicate with the annular separation chamber and thereby receive the gaseous fluid from which solids have been removed. A gaseous fluid outlet is connected to the core adjacent its upper portion to conduct gaseous fluid from the outlet conduit and the assembly. The improvement according to this invention comprises a by-pass gate or valve for controlling the flow area of a by-pass opening in the wall of the core which opening communicates the separation chamber with the gaseous fluid outlet passageway. The adjustment of the by-pass valve relative to the mass characteristic of the mixture of the solid particles entrained in the gaseous fluid stream, bypasses at least a portion of the gaseous fluid stream containing the particles below a selected minimum mass so that all of the separated solids collected in the collection chamber are substantially of the desired mass values.

The apparatus may also include means for rotatively supporting and adjusting the core relative to the shell and thereby position the by-pass gate or valve within the separation chamber. This core adjustment means coacts with adjustment of the by-pass gate valve to provide a more precise separation of desired mass particles from the gaseous fluid stream than might be achieved only by the adjustment of the by-pass valve.

BRIEF DESCRIPTION OF DRAWINGS

The invention will be more fully understood from the following description when considered in connection with the accompanying drawings in which.

DESCRIPTION OF PREFERRED EMBODIMENT

Figure 1:
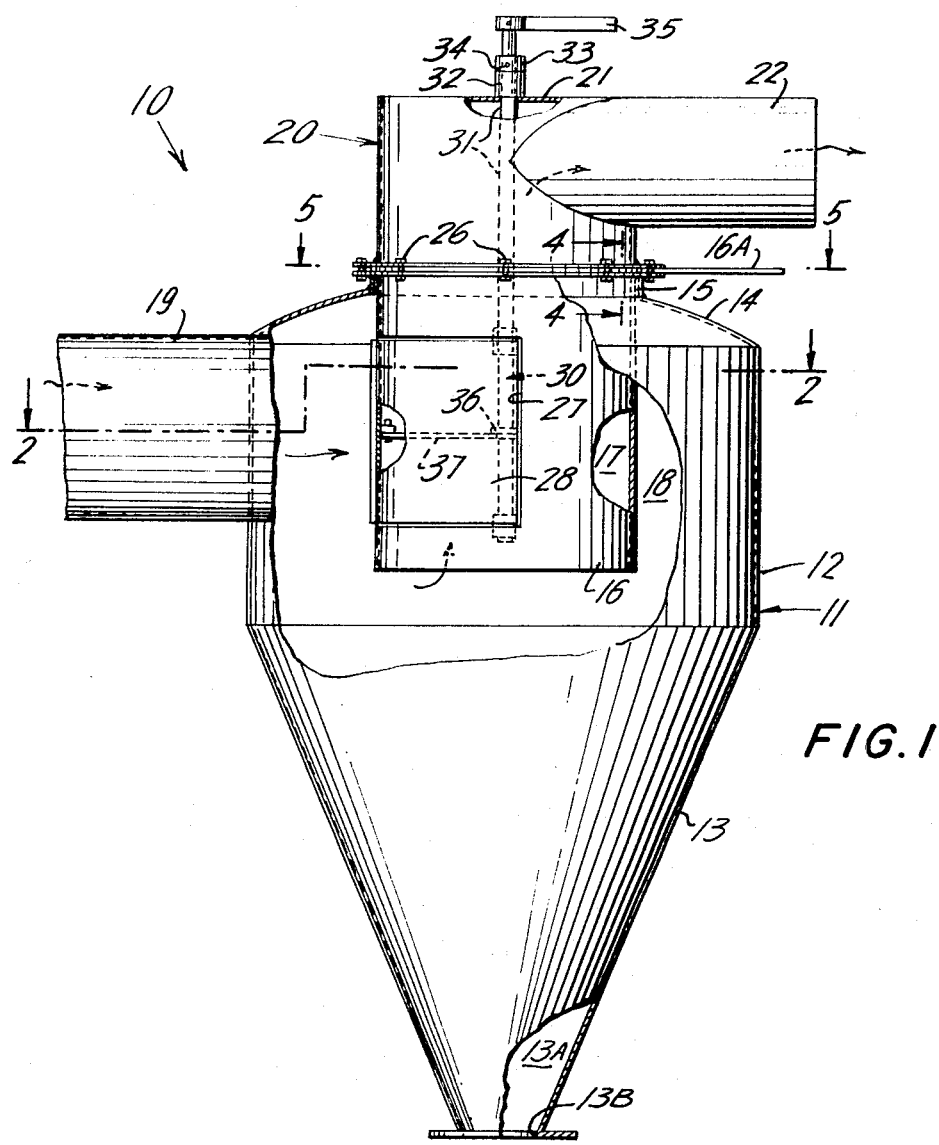
FIG. 1 is a side elevational view of the cyclone separator according to this invention with parts broken away for illustrative purposes only.
Figure 2:
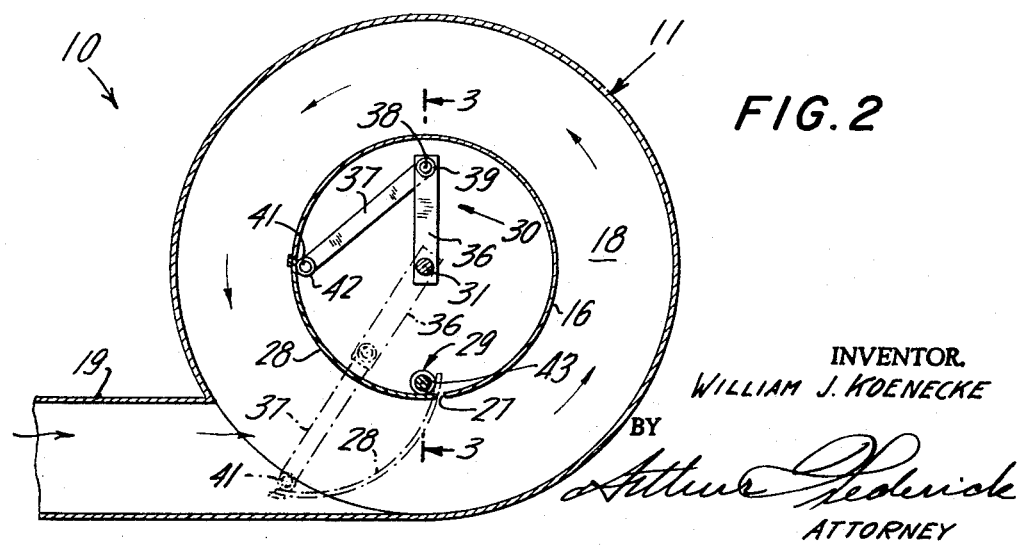
FIG. 2 is a cross-sectional view taken along line 2—2 of FIG. 1.

Now referring to the drawings and, more particularly, FIGS. 1 and 2, the reference number 10 generally designates the cyclone separator according to this invention. The cyclone separator comprises a housing or shell 11 which has an upper cylindrical portion 12, a lower, inverted, frusto-conical shaped portion 13, forming a solids collection chamber 13A, and an upper, dish shaped portion 14 having a centrally located cylindrical outlet neck portion 15. Projecting through the cylindrical neck portion 15 is a hollow cylinder or core 16, the interior of which serves as an outlet conduit or passageway 17. The outer peripheral surface of the core defines with the interior of the cylindrical portion 12 of shell 11, an annular separation chamber 18. An inlet conduit 19 is connected to cylindrical portion 12 of shell 11 to extend tangentially of the latter. The inlet conduit 19 is connected at one end to a source (not shown) of pressurized, gaseous fluid, such as air, in which solid particles, such as peening shot, are entrained to receive the gaseous fluid and emit the same into annular separation chamber 18. Connected to the top of cylindrical neck portion 15 is an outlet cap 20 which is closed at the top by a wall 21 and has a tangentially extending outlet conduit 22. The outlet conduit 22 is connected to discharge the gaseous fluid from which solid particles have been disentrained to atmosphere or to a place of recovery (not shown).

The cyclone separator 10, as thus far described, is representative of a conventional cyclone separator in which a gaseous fluid, bearing entrained solid particles, is conducted into an annular separation chamber 18, through inlet conduit 19. Since the gaseous fluid and the indiscriminate mixture of solids of different masses entrained by the gaseous fluid enters the annular separation chamber 18 tangentially thereof and is guided by the curved walls defining separation chamber 18, the admixture is forced to change direction and flow in a circular direction thereby causing the heavier solid particles to be centrifugally forced, outwardly in a radial direction, toward the inner surface of portion 12 of shell 11. As the gaseous fluid flows in a downward helical flow pattern within chamber 18, more and more of the solid particles are disentrained from the air and fall into collection chamber 13A. The gaseous fluid which has been substantially freed of entrained solid particles, passes from separation chamber 18 into outlet passageway 17 and upwardly into outlet cap 20, thence through outlet conduit 22. The separated, solid particles collected in collection chamber 13A are either continuously or intermittently removed by gravity, through an outlet 13B.

Figure 5:
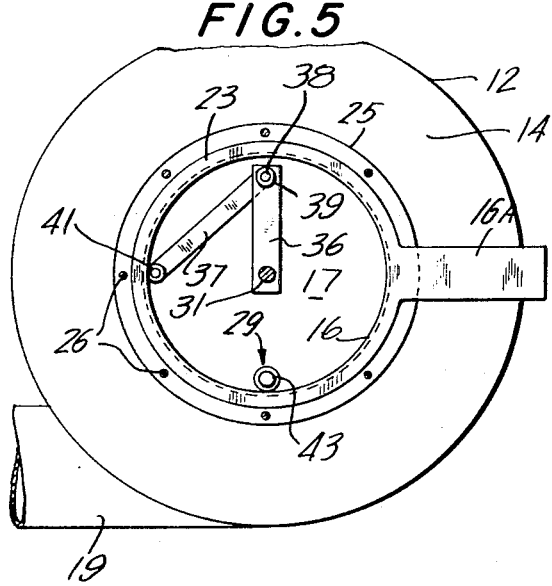
FIG. 5 is a cross-sectional view taken substantially along line 5—5 of FIG. 1.
Figure 4:
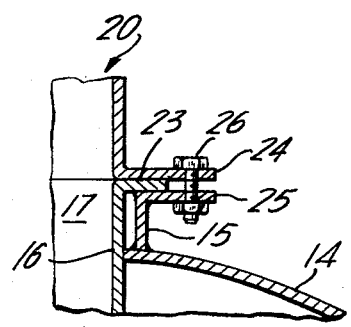
FIG. 4 is a fragmentary cross-sectional view taken substantially along line 4—4 of FIG. 1 and on a somewhat enlarged scale.

As best shown in FIG. 4 and in accordance with this invention, core 16 has a peripheral lip 23 which extends between the juxtaposed annular flanges 24 and 25 on the distal end portions of cap 20 and cylindrical neck portion 15, respectively. A plurality of bolts 26 are disposed to extend through circumferentially spaced registered holes in flanges 24 and 25 to provide for clamping lip 23 of core 16 therebetween and, thus, secure core 16 in a predetermined fixed annular position within shell 11. To facilitate rotative positioning of core 16, for purposes hereinafter discussed, a handle 16A is secured at one end to lip 23 to project in a radial direction normal to the longitudinal axis of core 16 (see FIGS. 1 and 5).

Also, according to the present invention, core 16 is provided with a by-pass opening or port 27, which communicates separation chamber 18 with outlet passageway 17. The flow area of by-pass opening 27 is controlled by a valve or gate 28 which is pivotally supported on core 16 adjacent opening 27 by a hinge assembly 29. The gate 28 is adjustable in an infinite number of positions between the fully closed position shown by full lines in FIGS. 1 and 2 and a fully open position shown by broken lines in FIG. 2. To provide for actuation of by-pass gate 28, an adjustment assembly 30 is provided.

Figure 3:
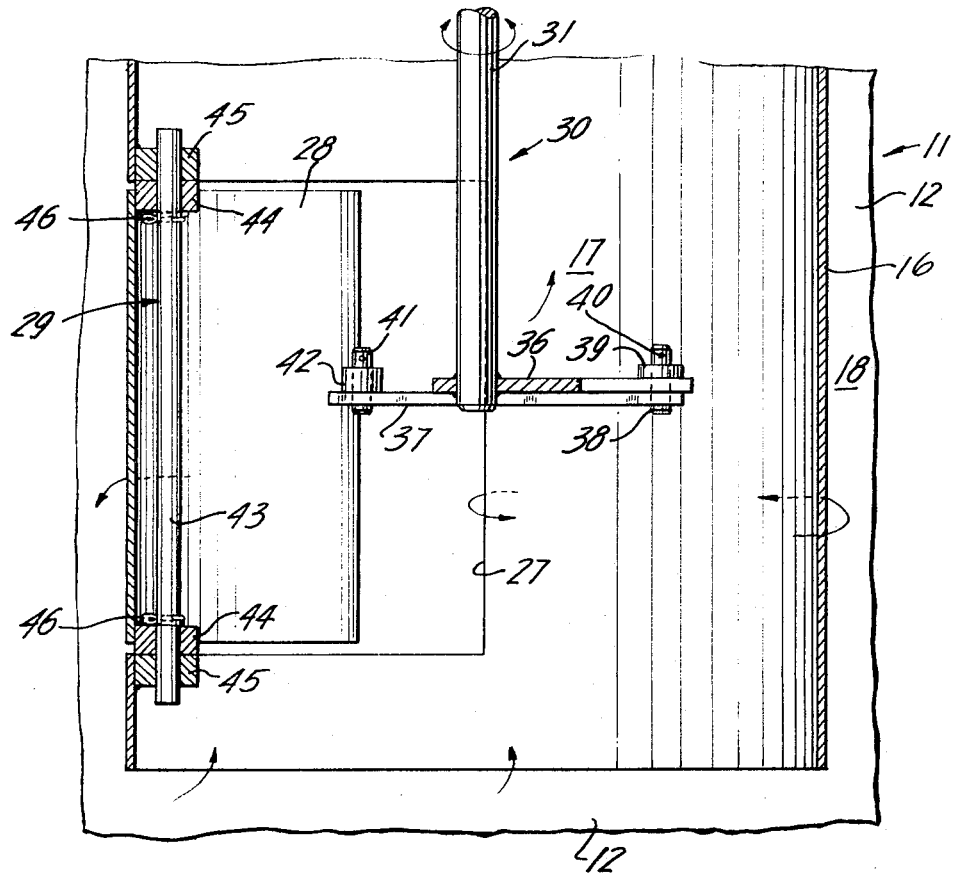
FIG. 3 is a fragmentary sectional view taken along line 3—3 of FIG. 2, shown on a somewhat enlarged scale and with the by-pass valve in a partially open position.

As is best shown in FIGS. 1, 2, and 3, adjustment assembly 30 comprises a shaft 31 which extends coaxially within outlet cap 20 and core 16 and is journalled for rotation in a bearing 32 mounted on wall 21 of outlet cap 20. The shaft 31 is held vertically by a collar 33 which is secured to the shaft by a pin 34 or other suitable means. The collar 33 is positioned on shaft 31 so that, when the collar abuts the top surface of bearing 32, shaft 31 is held so that the inner end of shaft 31 lies at about the vertical, mid-point of by-pass gate 28. An actuating handle 35 is secured to the outer, upper distal end portion of shaft 31. A crank type linkage assembly interconnects by-pass gate 28 with shaft 31, which linkage assembly comprises an arm 36 secured, as by welding or other suitable means, adjacent the inner end portion to shaft 31 and a link 37 which interconnects the free end portion of arm 36 and by-pass gate 28. The link 37 is pivotally connected at one end to arm 36 by a pin 38 which is secured to link 37 and projects through a hole in arm 36. A collar or washer 39 is passed over the pin and a cotter key 40 is passed through a diametric hole in pin 39. The opposite end of arm 36 is similarly pivotally connected to by-pass gate 28 by a pin 41 which is secured to link 37 and extends through a collar or washer 42, the washer being secured, as by welding or other suitable means, adjacent the side edge of by-pass gate 28 opposite from hinge assembly 29.

The hinge assembly 29, as best illustrated in FIG. 3, comprises a pin 43 which extends through two spaced collars 44 secured to by-pass gate 28 adjacent the upper and lower edges of the latter. The pin also extends through a washer or collar 45 disposed adjacent to each of the collars 44 and secured to core 16 by welding or other suitable means. The pin 43 is held in position by cotter keys 46 which pass through diametric holes in the pin adjacent collars 44. The hinge assembly 29 is positioned on the downstream edge of the by-pass gate, in relation to the direction of gaseous fluid flow in separation chamber 18, and is connected to gate 28 so that the by-pass gate is movable, from the fully closed position, outwardly into the separation chamber and the path of flow of gaseous fluid to thereby deflect part of the gaseous fluid flow into and through by-pass port 27.

In effecting adjustment of by-pass gate 28, as herein described, handle 35 (FIG. 1) is grasped and moved in an arc to thereby rotate shaft 31. Assuming by-pass gate 28 to be closed, as shown in FIG. 2, and it is desired to open the gate to the fully open position indicated by the broken lines or an intermediate position such as shown in FIG. 3, handle 35 is moved in an assumed counter-clockwise direction as viewed in FIG. 2. This movement of handle 35 effects rotation of shaft 31 which rotates arm 36 in a counter-clockwise direction and forces link 37 to move to the left as viewed in FIG. 2. The movement of link 37 causes by-pass gate 28 to pivot in a counter-clockwise direction about hinge assembly 29.

The adjustment of by-pass gate 28 to an open position, as just described herein, functions to by-pass the undesirable lighter weight entrained solids to outlet passageway 17. These lightweight solids, if not by-passed, might otherwise be disentrained and recovered in solids collection chamber 13A if allowed to fully traverse the separation chamber. The extent to which by-pass gate 28 is required to be opened is dependent upon the velocity of the gaseous fluid in relation to the amount of entrained solid particles and the percentage of solid particles of an undesirable mass present in the total entrained solids mixture. A further refinement of adjustment in the by-pass function of by-pass gate 28 can be achieved according to another aspect of this invention hereinafter described.

As previously set forth, core 16 is constructed and arranged to be capable of rotation relative to shell 11. To permit rotation of core 16, clamping bolts 23 (see FIGS. 1 and 4) are loosened while others are removed to free the lip 23 of core 16 and release the core 16 for rotative movement to a desired angular position through force applied on handle 16A. For example, core 16 might be rotated in a counter-clockwise direction, as viewed in FIG. 2, to position by-pass opening 27 and gate 28 closer to inlet conduit 19 so that by-pass of some of the gaseous fluid and entrained solids occurs when separation residence time is less and the degree of solids separation is less. By combined positional adjustment of the amount of opening of by-pass gate 28 and the angular location of the gate 28 relative to inlet conduit 19 by rotative adjustment of core 16, a very accurate by-pass function can be achieved to minimize disentrainment of undesirable lightweight particles and minimize the amount of such undesirable solids recovered in the solids collection chamber 13A.

It is believed now readily apparent that a novel cyclone separator has been described which is capable of being adjusted to substantially eliminate from the recovered disentrained solids, solid particles of an undesirable minimum mass. It is a cyclone separator which provides a relatively simple and yet accurate means for by-passing a predetermined amount of gaseous fluid and entrained solids into the gaseous fluid outlet.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:
1. A cyclone separator comprising:
a. housing means forming a separation chamber therein;
b. inlet conduit means for introducing a gaseous fluid stream containing entrained solids of indiscriminate mass into the separation chamber;
c. an outlet conduit means forming an outlet passageway within the separation chamber and communicating at one end with the latter to receive the gaseous fluid stream after substantially complete separation of entrained solids from the gaseous fluid stream;
d. by-pass port means in the peripheral wall of said outlet conduit means communicating the separation chamber and outlet passageway;
e. a gate means cooperating with said by-pass port means for controlling flow through the latter and outwardly moveable from said peripheral wall into the path of the gaseous fluid stream in the separation chamber for deflecting a portion of the gaseous fluid stream containing entrained solids of undesirable mass through said by- pass port means into the outlet passageway before substantially complete separation of solids and gaseous fluid; and f. means for moving said gate means.

2. The apparatus of claim 1 wherein means is provided for rotating the outlet conduit means about its longitudinal axis to adjust the location of the by-pass port means with respect to the inlet conduit means.

3. The apparatus of claim 1 wherein said outlet conduit means is a hollow, open ended, cylinder extending centrally of the separation chamber and with the lower open end communicating the outlet passageway with the separation chamber and wherein said by-pass port means includes an opening in the wall of the cylinder and said gate means is pivotally hinged to the cylinder wall adjacent said opening.

4. The apparatus of claim 3 wherein said cylinder is supported by the housing means and rotatively adjustable about its longitudinal axis relative to the inlet conduit means to thereby provide for locating the by-pass port means within the separation chamber.

5. The apparatus of claim 3 wherein the gate means includes an actuating means comprising:
   a. a shaft supported by the housing means to extend from a point exterior of the latter to a point adjacent by-pass port means, and
   b. a crank type linkage interconnecting the gate means with the shaft so that rotation of the shaft about its longitudinal axis effects pivotal movement of the gate means about said hinged attachment to the cylinder wall.

6. The apparatus of claim 3 wherein the housing means includes two cylindrical elements each of which have a first peripheral flange portion disposed adjacent each other and the cylinder has a second peripheral flange portion which is clamped between said first peripheral flange portions.

7. The apparatus of claim 6 wherein said cylinder has a handle extending radially and exteriorly of the housing means to facilitate rotation of the cylinder when unclamped.

* * * * *